May 25, 1965  H. A. FOSS ETAL  3,185,071
CITRUS FRUIT JUICE EXTRACTOR
Filed Sept. 14, 1962  3 Sheets-Sheet 1
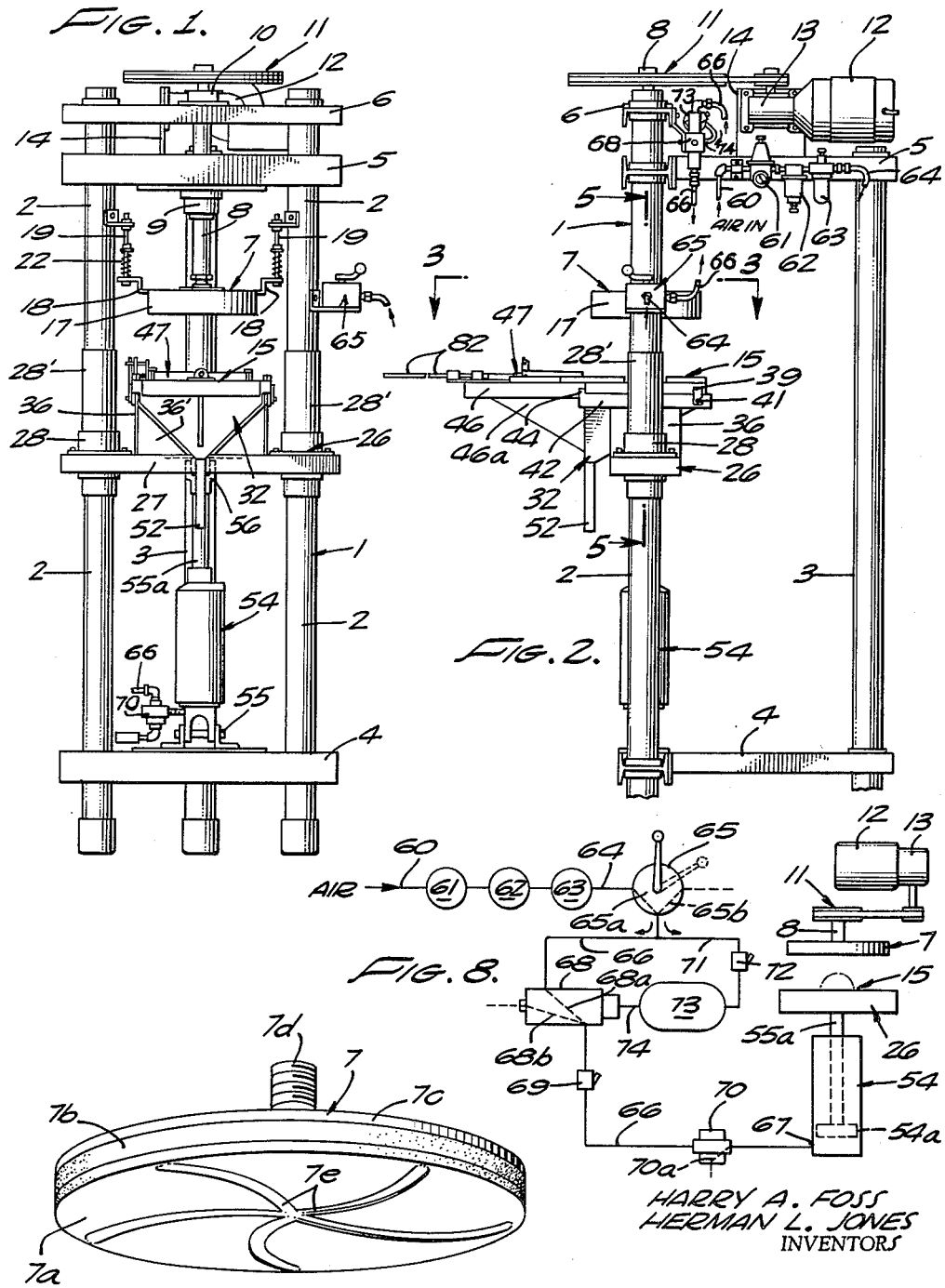
HARRY A. FOSS
HERMAN L. JONES
INVENTORS
BY Paul A. Weilein
ATTORNEY

HARRY A. FOSS
HERMAN L. JONES
INVENTORS

BY Paul A. Weilein
ATTORNEY

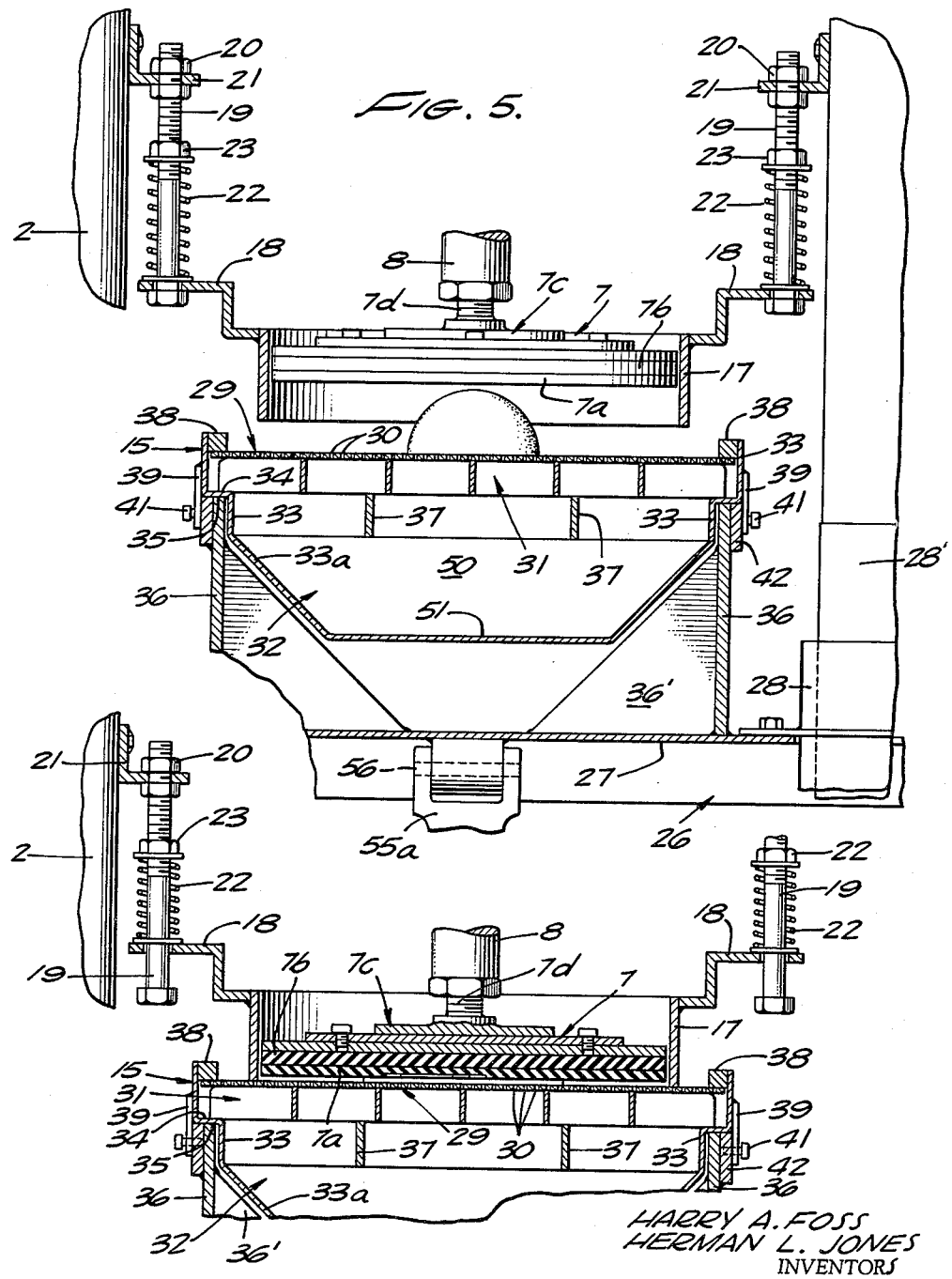

3,185,071
CITRUS FRUIT JUICE EXTRACTOR
Harry A. Foss and Herman L. Jones, Winter Haven, Fla., assignors to Brown Citrus Machinery Corp., Whittier, Calif., a corporation of California
Filed Sept. 14, 1962, Ser. No. 223,645
21 Claims. (Cl. 100—53)

This invention relates to apparatus for extracting juice from citrus fruit and more particularly to an extractor that is especially adapted for use in testing citrus fruit.

In the purchasing of citrus fruit at packing houses and in the field, it is the practice before a sale is consummated to test a representative number of pieces of fruit of a given batch or crop to ascertain if the fruit contains a predetermined amount of juice and soluble solids considered necessary to qualify the crop or batch of fruit as a good marketable product.

In some states regulations have been established requiring that citrus fruit sold by growers test out as containing at least a specific amount of juice and soluble solids before sales may be made.

Various types of extractors have been used for making the above noted tests, and certain problems and objections have been encountered in the use of such extractors. In some instances the extractors as heretofore employed failed to express all of the juice in each piece of fruit being tested or they effected an expressing action which resulted in such a high pulp content in the juice that accurate hydrometer testing of the juice could not be carried out. When less than the total yield of juice takes place a true test as to the maturity and fitness of the fruit for the market cannot be made.

These objections are due in part to lack of control of the extracting pressure and the duration and nature of such pressure in extractors as heretofore used. Moreover, the construction and mode of operation of extractors as heretofore used for test purposes has been such that the juice did not drain rapidly and thoroughly from the surfaces onto which the juice was expressed and the amount of juice retained on such surfaces precluded a true test of the fitness of the fruit. Again, the retention of juice and pulp on such surfaces will carry over to the test of the next piece of fruit, thereby producing an inaccurate amount of juice extracted per piece of fruit and often adding objectionably to the pulp content of the juice.

It has been found that for testing purposes such as heretofore noted, a juice extractor in order to be efficient should have the characteristics as follows:

(1) Minimum sensitivity to fruit size, variety and maturity of seeded or seedless fruit.

(2) Ability to accommodate fruit ranging in size from five and one-half inch diameter grape fruit to one and one-half inch diameter oranges, tangerines and lemons, without changing parts or making pronounced adjustment.

(3) Controlled extracting pressure as to intensity and duration for the purpose of obtaining a maximum yield of juice with a minimum of pulp and other undesirable components of the fruit.

(4) A minimum of retention of juice, pulp and other components of the fruit, by providing for complete and rapid drainage of juice to prevent a carry-over of the retained substances from one test to another.

(5) Small bulk and low weight to facilitate transportation into groves for field testing and use of the extractor for testing small as well as larger quantities of fruit.

(6) A construction making it possible readily to remove and effectively clean all parts in locations where washing facilities are limited.

(7) A construction and control such that the juice extracted by the machine does not require any finishing treatment in order to be tested.

It is the primary object of the invention to provide a juice extractor which will eliminate the objections heretofore encountered in testing citrus fruit and afford the above noted desirable structural and operational characteristics as well as other advantages hereinafter described.

It is another object of this invention to provide a juice extractor that will achieve the above objectives in a particularly efficacious manner through the medium of a novel arrangement of a rotary pressure member and a fruit engaging member wherein one of the members is perforate and relative movement of the members for applying juice extracting pressure to fruit disposed therebetween is effected by power operated means and control means for the power operated means. The control means renders the extractor operable to subject fruit over a large range of sizes to juice extracting pressure of a controlled intensity and duration such as will assure a yield of all of the juice per piece of fruit treated, with a minimum of pulp and other undesirable components of the fruit, whereby without further treatment, the extracted juice is subject to test accurately to determine the fitness of a given batch of fruit for the market.

It is a further object of this invention to provide a juice extractor such as next above described, wherein the fruit engaging member and the rotary pressure member are relatively moved in such a manner that when they reach predetermined positions in which the fruit is engaged with the rotary pressure member the two members will remain in that predetermined position for a predetermined period of time for the purpose of effecting a controlled juice extracting action while the rotary pressure member is rotated in engagement with the fruit so that an optimum yield of juice will be obtained with a minimum of pulp and other components of the fruit.

Another object of this invention is the provision in an extractor such as described of a novel guard member which confines the extracted juice and pulp to a predetermined area of the perforate fruit supporting member to assure maximum yield of juice and to retain the pulp and other residual fruit parts remaining on the perforate member so that ready removal thereof may be effected before another juice extracting operation takes place.

Another object of this invention is the provision in an extractor such as described of a novel means for feeding cut halves of citrus fruit into position to have the juice expressed therefrom.

Another object hereof is to provide novel means for removing from the perforate fruit supporting member all pulp, seed, and fruit parts remaining after each juice extracting operation and which is operated incident to the feed means positioning a fruit half for having juice extracting pressure applied thereto.

Other objects and advantages of the invention will be hereinafter described or will become apparent to those skilled in the art, and the novel features of the invention will be defined in the appended claims.

Referring to the drawings:

FIG. 1 is a front elevation of a citrus fruit juice extractor embodying the present invention;

FIG. 2 is a side elevation of the extractor shown in FIG. 1;

FIG. 5 is a fragmentary enlarged sectional view taken on the line 5—5 of FIG. 2;

FIG. 6 is a fragmentary sectional view similar to FIG. 5, but showing parts of the extractor broken away and other parts in section and in a different position than in FIG. 5;

FIG. 7 is a perspective view of the rotary pressure member of the extractor, removed therefrom; and FIG. 8 is a schematic view of control means and associated fluid circuitry for controlling the operation of the extractor.

Figure 3:
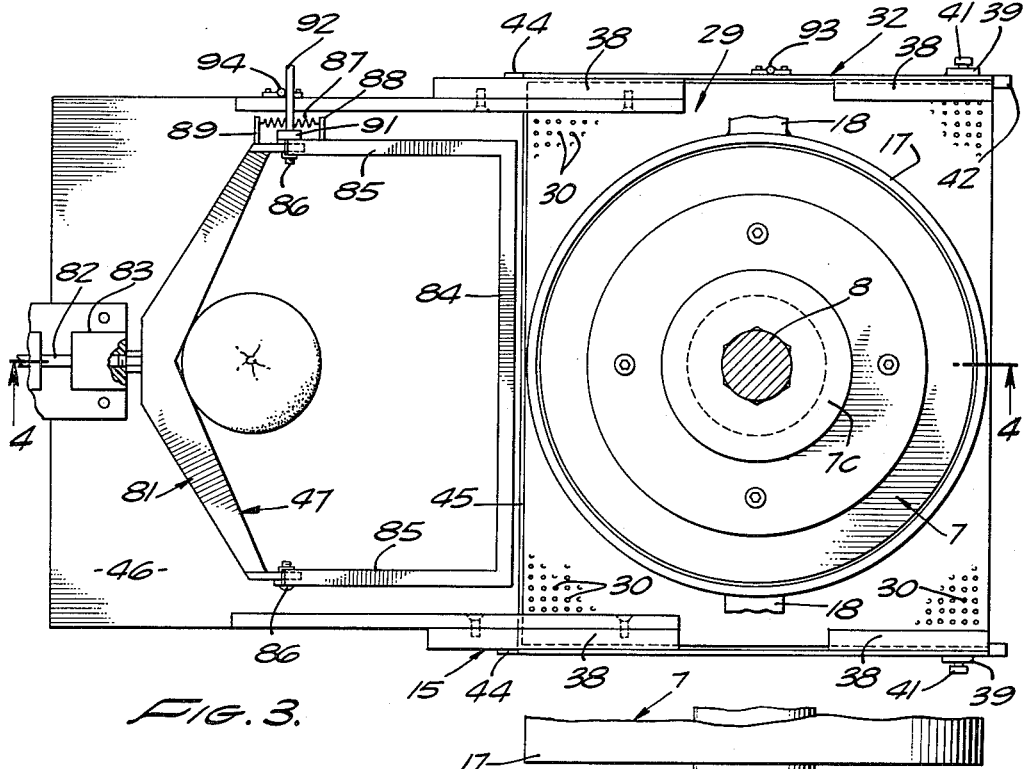
FIG. 3 is a sectional view on an enlarged scale, taken on the line 3—3 of FIG. 2.

The illustrative embodiment of a juice extractor made in accordance with the present invention includes a skeleton upright frame structure 1 made of a pair of front legs 2, a rear leg 3 centered behind the front legs, a T-shaped cross member 4 joined to the lower portion of the legs 2 and 3, and a similar cross member 5 connected to the upper portions of the legs 2 and 3. In addition, a top cross bar 6 extends between the front legs 2. This frame structure supports, as will be herein after noted, all of the working parts of the extractor and constitutes therewith a compact portable unit subject to being readily transported from place to place.

In accordance with this invention there is provided in the upper portion of the frame 1 between the front legs 2 a pressure member 7 here shown as of circular form and supported on the lower end of a rotary vertical shaft 8 journalled in bearings 9 and 10 in the cross members 5 and 6. At its upper end the shaft 8 is driven by a belt and pulley drive unit 11 operated by an electric motor 12 through a suitable reduction unit 13 whereby the shaft 8 and pressure member 7 may be driven at a comparatively slow speed. The motor 12 and associated parts are supported on the cross member 5 with the aid of a suitable bracket or mounting plate 14 as shown in FIG. 2.

A perforate fruit supporting and juice extracting member 15 is mounted on the frame 1 for cooperation with rotary pressure member 7 to extract juice from halves of citrus fruit when the member 15 with a fruit half thereon is moved, as will be hereinafter described, toward the rotary member 7 so as to press the fruit half thereagainst.

It is desired that the fruit contacting surface of the rotary pressure member 7 be yieldable to avoid tearing or abrading the rind of a fruit half pressed thereagainst and consequent release of rind oil and bits of rind during the juice extraction operation. Accordingly, the member 7, as shown in FIGS. 7 and 8, may be made up of a compressible elastomer disk 7a and softer elastomer disk 7b which lateer is vulcanized or otherwise joined to the disk 7a and to a metal base unit 7c fixed to the shaft 8 by the fastening means 7d, as shown in FIG. 6, whereby the disk 7a provides a yieldable fruit contacting surface. In this connection it should be noted that the disk 7a may have its lower surface scored by spirally arranged grooves 7e which function to directionally sweep juice, pulp, seeds and other fruit parts derived by the juice extraction action of the members 7 and 15, toward the center of the member 7.

It is desired to confine the juice seeds, pulp and other fruit parts to that part of the perforate member 15 directly opposite the rotary and circular pressure member 7 to assure a thorough and quick drainage of the juice through the perforate member 15 and provide for ready removal of residual matter on the member 15 in a manner to be hereinafter described. This confining of the juice and fruit parts to a predetermined area between the members 7 and 15 may be accomplished, as here shown, by a splash guard in the form of a cylindrical band or ring 17 surrounding the rotary member 7 and yieldably supported on the front legs 2 so as to be contacted by the fruit supporting member 15 as the latter moves into juice extracting relation to the member 7. The band 17 has arms 18 extending laterally from opposite sides thereof and slidably supported on bolts 19 vertically adjustably secured by means of nuts 20 to brackets 21 fixed on the legs 2. The arms 18 normally rest on the heads of the bolts 19, being yieldably held thereagainst by springs 22 confined on the bolts between the arms 18 and stop nuts 23, whereby the arms 18 will slide upwardly against the force of the springs 22 when the lower edge of the band 17 contacts the perforate member 15. With this arrangement, during the application of juice extracting pressure by the opposed members 7 and 15, the band 17 will serve as a barrier or shield surrounding the area of the perforate member 15 on which the fruit is supported, thereby confining the juice and other components released to that area.

The perforate fruit supporting member 15 is mounted on a carriage 26 reciprocably mounted on the front legs 2 and including a cross bar 27 having tubular guides 28 fixed to the ends thereof and slidable on bushings 28' fitted on the front legs 2 to provide for smooth action of the carriage on being moved toward and away from the pressure member 7.

Figure 4:
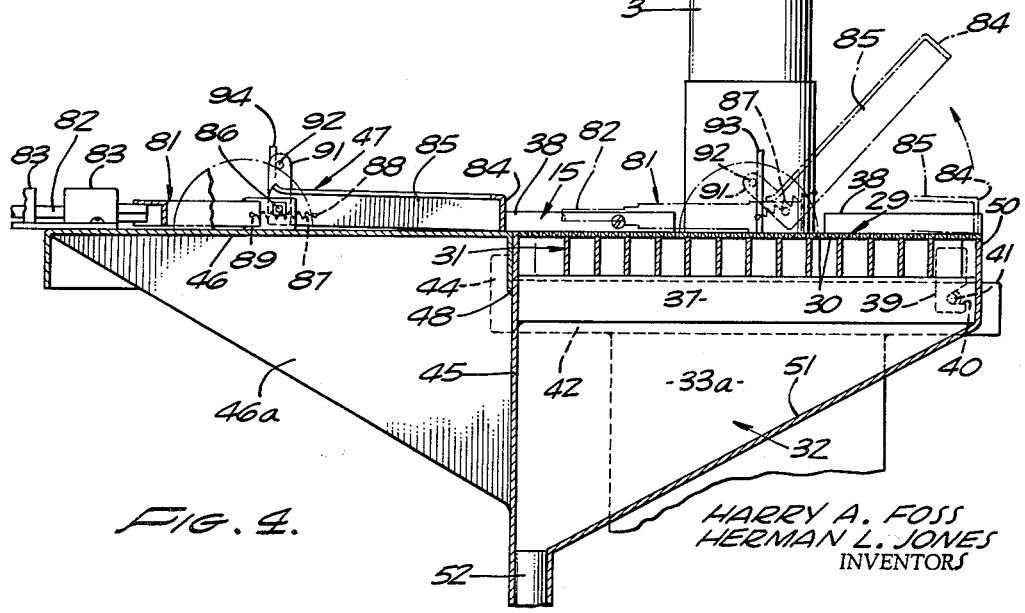
FIG. 4 is a sectional view taken on the line 4—4 of FIG. 3.

The fruit supporting member 15, as here shown, includes a thin steel screen plate 29 having a series of perforations 30 therein. The plate 29 is reinforced by a steel grid 31 engaged with the underside of the plate, the plate and grid being removably mounted in the rectangular upper end or mouth of a juice collecting funnel 32 mounted on the carriage 26. The funnel 32, as shown in FIGS. 3, 4 and 5, has opposite side walls 33 which are offset just below the upper edges thereof to define shoulders 34 and 35 interiorly and exteriorly thereof, respectively. The external shoulders 35 rest upon the upper edges of upright supporting plates 36 welded to the cross bar 27 of the carriage 26 to removably support the funnel on the carriage. The plates 36 are supported in upright position by means of gusset plates 36' welded to this cross bar 27 and the inner surfaces of the plates 36. The internal shoulders 34 act as supports for the grid 31 which is removably rested thereon. An additional support for the grid 31 is afforded by a pair of bars 37 fixed within the funnel so as to engage the underside of the grid.

The side walls 33 of the funnel 32, as shown in FIGS. 3 and 5, extend above the plane of the screen plate 29 and each side wall has a pair of hold-down bars 38 welded to the inner surface thereof so as to engage the upper side of the screen plate 29 to prevent upward dislodgement thereof.

The funnel 32 is removably held in place by latch members 39 welded to the outer sides of the side walls 33 of the funnel and provided with notches 40 for receiving latch pins 41, projecting outwardly from bars 42 welded to the outer sides of the supporting plates 36, as shown in FIGS. 4 and 5. The bars 42 are flush at their upper edges with the upper edges of the plates 36 and are engaged with the shoulders 35 on the funnel. The bars 42 also have upwardly directed lug portions 44 on the outer ends thereof to engage portions of the front wall 45 of the funnel 32, as indicated in FIG. 4, so that the funnel is restrained against lateral movement outwardly from between the upright supports 36.

A fruit supporting shelf 46 is carried by the front end of the extraction member 15 so as to be flush with the screen plate 29, and has mounted thereon means 47 operable for feeding fruit halves onto the screen plate and for removing residual matter from the top of the screen plate. As here shown, the shelf 46 is welded as at 48 to the front wall 45 of the funnel 32, and is additionally supported by means of a vertical plate 46a welded to the wall 45 and bottom of the shelf as shown in FIG. 4. The shelf 46 with the feed means 47 thereon together with the funnel 32 and screen plate 29, constitute a unit that is detachable from the carriage 26. With reference to FIGS. 2, 3 and 4, it will be apparent that upon lifting upwardly this unit at the outer end of the shelf 46 until the front wall 45 of the funnel 32 is clear of the lugs 44 on the bars 42, the unit may be pulled outwardly and upwardly so as to disengage the latch members 39 from the pins 41 on the bars 42. When the unit is detached in this manner, the screen plate 29 and grid 31 may be removed by first sliding the plate 29 from beneath the bars 38 over the rear wall 50 of the funnel 32, then lifting out the grid 31. With this arrangement the parts of the removable unit readily may be cleaned. In replacing the unit, it is moved downwardly and forwardly with the end containing the latch members 39 lowermost and the opposite end elevated so that catch members may engage the pins 41 to lock the unit against further forward movement, whereby the unit may then be lowered to dispose the front wall 45 of the funnel in locked engagement with the lugs 44 on the bars 42.

As shown in FIG. 5, portions 33a of the side walls of the funnel 32 converge downwardly and are joined to a bottom wall 51 which is inclined from the short vertical rear wall 50 to the vertical front wall 45 where the discharge spout 52 is joined to the funnel. This spout 52 will discharge juice downwardly so that a suitable container, not shown, may be placed beneath the spout to receive the juice.

The carriage 26 with the juice extracting means 15 thereon is raised and lowered by fluid pressure operated means here shown as piston and cylinder unit 54 pivoted at 55 on the cross member 4 with the piston rod 55a pivoted as at 56 to the cross bar 27 of this carriage 26.

Means are provided for controlling the operation of the piston and cylinder unit 54 in order that the juice extracting pressure exerted against each piece of fruit between the extracting members 7 and 15 may be controlled as to intensity and duration, since by this control optimum amounts of juice with a minimum of pulp and other undesirable components of the fruit may be obtained whereby a true test of the maturity and fitness of a particular batch or crop of fruit for marketing may be carried out.

As schematically shown in FIG. 8, the piston and cylinder unit 54 and the control means therefor are operated by compressed air from a suitable source not shown. Elements of the means for controlling the operation of the piston and cylinder unit 54 are shown in FIGS. 1 and 2, as actually mounted on the frame structure of the extractor.

Referring now to FIG. 8, it will be seen that compressed air is supplied from a source, not shown, through a line 60, so as to pass through a pressure regulator 61, a filter 62 and a lubricator unit 63, thence through a line 64 to a manually operable control valve 65. The valve 65 is connected by a line 66 to the combined intake and exhaust port 67 at the lower end of the cylinder of the piston and cylinder unit 54. A conventional three-way air pilot operated valve 68 that is normally open is connected in the line 66 as are also a conventional adjustable air flow control valve 69 and a conventional automatic fast action exhaust valve 70. From the line 66 a line 71 leads through an adjustable conventional flow control valve 72 to an air capacity chamber or accumulator 73 from which latter a line 74 leads to the normally open air operated valve 68 for controlling the latter.

In the operation of the piston and cylinder unit 54 to raise the carriage 26 to dispose the extracting means 15 in position to cooperate with the rotary pressure member 7 for expressing juice from a fruit half placed with the cut face down on the screen plate 29, the operator moves the valve 65 to the position shown in full lines in FIG. 8. Air will now flow through the passage indicated by the dotted lines 65a in the valve 65 into the line 66 and through the normally open passage 68a in valve 68 to the port 67 in the cylinder unit 54 to thereby elevate the piston 54a and carriage 26 connected to the piston.

The rate of upward movement of the carriage 26 and member 15 thereon is controlled by the valve 69 which is adjusted to regulate the flow of air from the normally open valve 68 to the cylinder unit 54, so that a steady and smooth upward movement will take place at a reasonable speed which will assure that the fruit half will remain in place, it being obvious that upward movement at a fast rate would defeat the purpose of this action of the extractor.

During this upward movement of the carriage 26 and extractor member 15 thereon, air from the line 66 is directed through line 71 and flow control valve 72 into the capacity chamber 73. The valve 72 is adjusted so that the rate of flow of air into the chamber 73 is such that a predetermined period of time is required to bring the air pressure in the chamber 73 to equal that of the line pressure flowing through the normally open valve 68, this period of time being that required to effect movement of the carriage and extraction member into uppermost juice extracting position and to maintain it in that position for a few seconds as a dwell period during which the pressure member 7 is rotated in contact with the fruit, this being an important phase of the extraction operation assuring optimum extraction of juice.

When the air pressure in chamber 73 equals that of air pressure in line 66 between valve 68 and valve 65, the valve 68 is actuated responsive to pressure from chamber 73 to shut off flow of air to the cylinder unit 54 and to open an exhaust passage to atmosphere indicated by the dotted line 68b. The weight of the carriage 26 and elements supported thereby now causes the piston 54a of unit 54 to lower and thereby lower the extraction member 15 and carriage 26. This causes air in the cylinder unit 54 to exhaust through port 67 and line 66 and out of passage 68b in valve 68. A quick exhaust of air and return of the piston 54a and carriage 26 to lowermost position is effected by the quick action exhaust valve 70 which reacts to reduced pressure on the intake side thereof to fully open to the atmosphere through a passage indicated by the dotted line 70a.

To prepare the apparatus for the next extraction operation the manually operable valve 65 is moved to the position indicated by the dotted showing of the handle so as to shut off flow from the source of air pressure and open exhaust passage indicated by the dotted line 65b thereby permitting air to exhaust from the chamber 73 and valve 68, through lines 71 and 66, respectively. During these exhaust cycles, the flow control valves in lines 66 and 71 permit of free flow in the direction in which air is exhausted through valves 65 and 68.

Upon placing another fruit half on the screen plate 29 and moving the valve 65 to the operating position shown in full lines in FIG. 7, another extraction operation may be carried out.

The juice extraction operations afforded by the apparatus as here provided will be facilitated by use of the shelf 46 and fruit feed and clean-off means 47 wherein the latter includes a substantially V-shaped member 81 slidable over the shelf 46 and screen plate 29 so as to dispose fruit halves one at a time in the desired position on the screen plate 29 so as to be centered with respect to the rotary pressure plate. The V-shaped feed member 81 is operated by means of a handle 82 connected thereto and extending outwardly through guides 83 axially spaced on the handle and fixed to the shelf 46. The V-shape of the feed member 81 assures that a fruit half placed cut face down on the shelf 46 in front of the member 81 will become centered in the member 81 in being moved onto the screen plate 29 whereby with each feed operation the fruit half will be moved into substantially the same spot on the screen plate so as to be engaged by the center of the rotary pressure plate.

A wipe-off bar 84 is connected to the V-shaped member 81 so as to sweep over the screen plate 29 and remove therefrom seeds, pulp and other residual fruit portions loosely disposed on the upper surface of the screen plate. This sweeping action takes place just before the final forward movement of the feed member that is required to position a fruit half at a predetermined location on the screen plate 29. Accordingly, the bar 84 is provided at its ends with arms 85 extending right angularly therefrom and pivoted as at 86 on the ends of the V-shaped feed member 81, which latter is normally urged into close contact with the shelf 46 and screen plate 29 by means of a retractile spring 87 which is secured at its ends to pins 88 and 89 on one of the arms 85 and one end of the V-shaped feed member 81, respectively, so as to extend under the adjacent pivot 86.

Means are provided for swinging the wipe-off bar 84 upwardly so that on retraction of the V-shaped feed member 81 the bar will move clear of the fruit half that has been positioned on the screen plate for having juice extracting pressure applied thereto. For this purpose one of the arms 85 is provided with an upstanding crank arm 91 at the pivoted end thereof. A pin 92 is fixed to and extends laterally outwardly from the upper end of the crank arm 91 so that upon movement of the feed member 81 into its extreme forward and retracted positions, respectively, the pin 92 will contact upstanding stop pins 93 and 94 fixed on one side wall of the funnel member 32 and on the shelf 46, respectively. When the feed member 81 is moved forwardly for disposing a fruit half in position to be subjected to juice extracting pressure on the screen plate 29, the pin 92 on the crank arm 91 will engage the stop pin 93 just before the feed member 81 reaches its extreme forward position in which the fruit half is properly positioned on the screen plate. Consequently, on the final amount of forward movement of the feed member 81, which is a comparatively short movement, the pin 92 by its engagement with the stop pin 93 causes the arms 85 and bar 84 to swing upwardly, as shown in FIG. 4. The spring 87 is so located with respect to pivot 86 adjacent thereto that when the arms 85 swing upwardly, the spring will be disposed above the pivot 86 and thereby will exert a force holding the arm 85 and bar 84 in elevated position. The feed member 81 is now retracted, and the wipe-off bar remains in elevated position so that it will clear the fruit half positioned on the screen plate for having juice extracting pressure applied thereto. When the feed member 81 returns to its retracted position for effecting a feed of another fruit half into position on the screen plate, the pin 92 on the crank arm 91 encounters the stop pin 94 and causes the arms 85 and bar 84 to swing back into wipe-off position, aided by the spring 87. The fruit half is now subjected to juice extracting pressure in the manner hereinbefore noted.

On the movement of the feed member 81 to position the next fruit half for having the juice expressed therefrom, the wipe-off bar 84 will sweep the previously treated or flattened fruit half, seeds, etc., ahead of it off the screen plate 29 as the feed member is moved close to its final forward position following which on completion of the forward movement of the member 81, the wipe-off bar 84 will again be raised in the manner hereinbefore described and retracted, after which the fruit half is subjected to juice extracting pressure in the manner previously described.

It is desired that the rotary pressure member 7 be driven at a speed which, with the aid of the pressure exerted by the screen plate 29 and the member 7 at the top of the stroke of the plate 29, will cause all of the juice to be expressed from each fruit half without tearing the rind and releasing objectionable amounts of pulp, oil and components of the fruit other than juice. It has been found that a speed of rotation of the pressure member 7 of the order of 33 r.p.m. will afford the desired juice extracting action, although it is obvious that this rate of rotation may be varied as desired best to suit the particular fruit being treated.

The time during which the fruit is compressed between the rotary pressure member 7 and the screen plate 29 should not be too great, as long exposure of the fruit to this action may cause release of undesirable components of the fruit. Accordingly, it has been found that if this cycle is confined to about three seconds with a suitable slow speed of rotation of the member 7, the desired results will be attained. This timing is accomplished by the control means hereinbefore described which will become operative each time the manual control valve 65 is moved into position to start a juice extracting operation.

While specific structural details have been shown and described, it should be understood that changes and alterations may be resorted to without departing from the spirit of the invention as defined in the appended claims.

We claim:

1. A citrus fruit juice extractor, comprising: a frame; a pressure member; a fruit engaging member; one of said members having perforations therein to pass juice therethrough; means mounting said members on said frame for relative movement into and from a position for engaging and applying juice extracting pressure to a fruit half disposed between said members; means for rotating one of said members while said members are in said position for applying juice extracting pressure; operating means for effecting said relative movement of said members operable and controllable independently of operation of said means for rotating said one member, and means for controlling said operating means to maintain said members in contact with said fruit half for a predetermined period of time while said rotating member is engaged with the fruit half.

2. A citrus fruit juice extractor, comprising: a frame; a pressure member; a fruit engaging member; one of said members having perforations therein to pass juice therethrough; means mounting said members on said frame for relative movement into and from a position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; a guard ring; and means yieldably supporting said ring in position to yieldably contact said fruit engaging member in surrounding relation to said pressure member to confine the juice, pulp and rind to a predetermined area of said fruit engaging member when said members apply juice extracting pressure to the fruit.

3. A citrus fruit juice extractor, comprising: a frame; a rotary pressure member on said frame; a perforate fruit supporting member; means mounting said perforate fruit supporting member on said frame for movement to engage fruit supported thereon with said rotary pressure member and thereby apply juice extracting pressure to the fruit; operating means for so moving said fruit supporting member; a guard member; means supporting said guard member for movement into and from a position forming a wall around the fruit on said perforate member to confine the juice and pulp to a predetermined area of said perforate member; and means for rotating said pressure member operable and controllable independently of operation of said means for moving said fruit supporting member.

4. The extractor as specified in claim 3 wherein said guard member is annular and said supporting means yieldably supports said guard member in a position to contact said perforate fruit supporting member.

5. The extractor as specified in claim 3 including means providing a yieldable and a substantially flat fruit engaging surface on said rotary pressure member.

6. A citrus fruit juice extractor comprising: a frame; a rotary pressure member on said frame; a perforate fruit supporting member; means mounting said perforate fruit supporting member on said frame for movement to engage fruit supported thereon with said rotary pressure member and thereby apply juice extracting pressure to the fruit; operating means for so moving said fruit supporting member; means for rotating said pressure member; and means for controlling the operation of said operating means to maintain said perforate fruit supporting member for a predetermined period of time in a position in which said rotary pressure member engages the fruit.

7. A citrus fruit juice extractor, comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members; operating means for effecting said relative movement of said members; and control means operable in response to movement of said fruit engaging member into a predetermined position in which said fruit engages said pressure member for actuating said operating means to momentarily maintain said fruit engaging member in said predetermined position and thereafter to retract said fruit engaging member from said predetermined position.

8. A citrus fruit juice extractor, comprising: a frame; a rotary pressure member on said frame; drive means for rotating said rotary pressure member; a peforate fruit supporting member; a carriage reciprocably mounted on said frame and supporting said perforate member for movement toward and away from said rotary pressure member; operating means for moving said carriage to dispose said fruit supporting member in a position in which fruit thereon will be engaged by said rotary pressure member and subjected to juice extracting pressure; and control means operable through said operating means in response to said fruit supporting member reaching a position in which the fruit engages said rotary member while the latter is rotated to maintain said fruit supporting member in said position for a predetermined period of time.

9. A citrus fruit juice extractor, comprising: a frame; a rotary pressure member on said frame; a perforate fruit supporting member; means mounting said perforate fruit supporting member on said frame for movement to engage fruit supported thereon with said rotary pressure member and thereby apply juice extracting pressure to the fruit; operating means for so moving said fruit supporting member; means for rotating said pressure member operable and controllable independently of operation of said means for moving said fruit supporting member, means carried by and providing adjacent said perforate fruit supporting member a surface for supporting a fruit half; positioning means movable over said surface and said perforate fruit supporting member for moving said fruit half from said surface onto said perforate fruit supporting member and into a position to be engaged by said rotary pressure member; means for so moving said positioning means and retracting it from said fruit supporting member; a clean-off element operatively connected with said positioning member and movable therewith to remove from said fruit supporting member the spent fruit half and residual matter resulting from a previous fruit extraction operation; and means operable during retraction of said positioning means and clean-off element for disposing said clean-off element out of the path of the fruit half previously positioned on said fruit supporting member and for returning said element to the path of the fruit half after said element clears the fruit half during said retraction.

10. In a citrus fruit juice extractor wherein opposed members are relatively movable to apply juice extracting pressure to a fruit half supported on one of said members and means are provided for effecting movement of said one member toward the other of said members; the improvement which includes means carried by said one member providing a surface for supporting a fruit half to one side of said one member; positioning means movable over said surface to move a fruit half therefrom onto said one member into a position for having juice extracting pressure applied thereto by said members; means for so moving said positioning means and for retracting it to one side of said one member; a wipe-off element; means connecting said wipe-off element with said positioning means for movement therewith to remove from said one member a spent fruit half and other residual matter when said positioning means is moved to position another fruit half onto said one member; means operable following said wipe-off action of said wipe-off element to elevate said element from wipe-off position so as to clear the fruit half on said one member during the retraction therefrom of said positioning means and wipe-off element; and means operable upon retraction of said wipe-off element past the fruit half on said one member for moving said wipe-off element back into position for effecting a wipe-off action during the next operation of said positioning means.

11. In a citrus fruit juice extractor wherein opposed members are relatively movable to apply juice extracting pressure to a fruit half supported on one of said members and means are provided for effecting said relative movement; the improvement which includes means providing a shelf carried by said one member for supporting a fruit half so that it may be moved therefrom onto said one member into a position in which juice extracting pressure may be applied thereto by said members; a positioning element operatively connected with said shelf; means operatively connected with said shelf and said positioning element for moving said positioning element so as to engage a fruit half on said shelf and move it into said position on said one member; said operating means for said positioning element being operable to retract said positioning element onto said shelf; a wipe-off bar; mounting means pivotally connecting said bar with said positioning element for movement therewith in advance thereof to engage and wipe off a spent fruit half during a fruit positioning operation of said positioning element; and means operatively connected with said shelf and said mounting means operable to elevate said bar so as to clear a fruit half in said position on said one member during retraction of said bar and to restore said bar to position in which it may be moved to effect another wipe-off operation upon retraction of said bar past said fruit half in said position on said one member.

12. A juice extractor, comprising: a pair of pressure applying members; means supporting said members for relative movement to engage fruit placed therebetween and subjecting the fruit to juice extracting pressure; operating means for effecting said relative movement of said members; means for rotating one of said members and operable independently of said operating means; and control means actuating said operating means to maintain said members in juice extracting engagement with said fruit for a predetermined period of time while said rotary member is rotated.

13. A juice extractor as set forth in claim 12, including a support for fruit positioned adjacent said members; and positioning means for engaging fruit on said support and moving the fruit onto one of said members.

14. A juice extractor comprising: a pair of pressure applying members; means supporting said members for relative movement to engage fruit placed therebetween and to subject the fruit to juice extracting pressure; operating means for effecting said relative movement of said members; means for rotating one of said members and operable independently of said operating means; a guard ring; and means supporting said guard ring for movement into a position forming a wall around said fruit to confine the juice and pulp to a predetermined area of one of said members while the fruit is being subjected to said juice extracting pressure by said members.

15. A citrus fruit juice extractor comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; and an annular guard member mounted for movement relative to said members to occupy a position forming a wall around the fruit half for confining the juice and pulp to a predetermined area of one of said members while the fruit half is subjected to said juice extracting pressure.

16. A citrus fruit juice extractor, comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; and positioning means carried by one of said members and operable for moving a fruit half into position between said members for having juice extracting pressure applied thereto.

17. A citrus fruit juice extractor, comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; means carried by one of said members and movable therewith providing a surface for supporting a fruit half to one side of one of said members; and means operable on said surface for moving said fruit half from said surface into a predetermined position between said members.

18. A citrus fruit juice extractor, comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; means associated with one of said members and movable therewith toward and away from the other of said members operable for effecting the discharge therefrom of a spent fruit half and other residual matter following a juice extracting operation.

19. A citrus fruit juice extractor, comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; means carried by one of said members and movable therewith relative to the other member providing a surface for supporting a fruit half to one side of one of said members; positioning means mounted on said surface operable for engaging and moving said fruit half from said surface into a predetermined position between said members; and clean-off means operatively connected with said positioning means and operable for effecting removal from one of said members of a spent fruit half and other residual matter upon operation of said positioning means to dispose another fruit half between said members.

20. A citrus fruit juice extractor, comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; support means carried by and movable with said fruit engaging member relative to said one member and providing a surface for supporting a fruit half adjacent said fruit engaging member; positioning means movable over said surface into a position between said members to move said fruit half from said surface into said predetermined position between said members; and means for so moving said positioning means and retracting it from said position between said members.

21. A citrus fruit juice extractor, comprising: a frame; a pressure member; a fruit engaging member; one of said members having perforations therein to pass juice therethrough; means mounting said members on said frame for relative movement into and from position for engaging and applying juice extracting pressure to a fruit half disposed in a predetermined position between said members; drive means for rotating one of said members while said members are in said position for applying juice extracting pressure; operating means for effecting said relative movement of said members operable independently of operation of said means for rotating said one member; support means carried by one of said members for movement therewith relative to the other of said members and providing a surface for supporting a fruit half adjacent one of said members; positioning means movable over said surface into a position between said members to move said fruit half from said surface into said predetermined position between said members; and means for so moving said positioning means and retracting it from said position between said members; clean-off means operatively connected to said positioning means for movement therewith and operable for removing a spent fruit half and other residual matter from between said members after each juice expressing operation, in response to operation of said positioning means to dispose another fruit half in said predetermined position between said members.

References Cited by the Examiner

UNITED STATES PATENTS

| | | | |
|---|---|---|---|
| 697,251 | 4/02 | Hubbell | 100—116 |
| 789,623 | 5/05 | McGrath | 100—131 |
| 1,053,590 | 2/13 | Gilchrist | 100—238 X |
| 1,115,754 | 11/14 | Walker | 146—3.9 |
| 1,661,374 | 3/28 | Lacey | 100—98 |
| 2,099,170 | 11/37 | Majewski | 146—3 |
| 2,160,523 | 5/39 | Scurlock | 146—3.9 |
| 2,432,886 | 12/47 | Hatch et al. | 100—53 X |
| 2,723,618 | 11/55 | Matthews | 100—211 X |
| 3,017,821 | 1/62 | Bireley et al. | 100—97 |

FOREIGN PATENTS

| | | |
|---|---|---|
| 700,855 | 1/31 | France. |
| 1,215,393 | 11/59 | France. |
| 572,348 | 10/45 | Great Britain. |

WALTER A. SCHEEL, *Primary Examiner.*

A. G. STONE, *Examiner.*